US007471241B1

(12) United States Patent
Yang

(10) Patent No.: US 7,471,241 B1
(45) Date of Patent: Dec. 30, 2008

(54) GLOBAL NAVIGATION SATELLITE SYSTEM (GNSS) RECEIVERS BASED ON SATELLITE SIGNAL CHANNEL IMPULSE RESPONSE

(76) Inventor: Chun Yang, 113 Clover Hill La., Harleysville, PA (US) 19438

( * ) Notice: Subject to any disclaimer, the term of this patent is extended or adjusted under 35 U.S.C. 154(b) by 94 days.

(21) Appl. No.: 11/188,258

(22) Filed: Jul. 25, 2005

(51) Int. Cl.
*G01S 5/14* (2006.01)
(52) U.S. Cl. .............................. 342/357.12; 342/357.15
(58) Field of Classification Search ............ 342/357.02, 342/357.12, 357.15
See application file for complete search history.

(56) References Cited

U.S. PATENT DOCUMENTS

| 4,187,000 | A | * | 2/1980 | Constant ...................... 359/107 |
| 5,218,621 | A | * | 6/1993 | Cudak et al. ................ 375/232 |
| 5,402,347 | A | * | 3/1995 | McBurney et al. ...... 342/357.15 |
| 5,402,442 | A | * | 3/1995 | Ishigaki ................. 342/357.12 |
| 5,721,555 | A | * | 2/1998 | Lennen .................. 342/357.12 |
| 2002/0183070 | A1 | * | 12/2002 | Bloebaum et al. ........... 455/456 |
| 2003/0215097 | A1 | * | 11/2003 | Crutchfield, Jr. ............. 381/61 |
| 2004/0130485 | A1 | * | 7/2004 | Rapoport et al. ....... 342/357.03 |

* cited by examiner

*Primary Examiner*—Thomas H. Tarcza
*Assistant Examiner*—Fred H. Mull
(74) *Attorney, Agent, or Firm*—LaMorte & Associates

(57) ABSTRACT

A Global Navigation Satellite System (GNSS) receiver and associated method for the reception and processing of GNSS signals. The GNSS receiver includes an antenna and an analog front-end to intercept the incoming radio-frequency signal and to convert it to an appropriate intermediate frequency for digital sampling. A baseband signal processor is organized into functionally identical channels, each dynamically assigned to a different satellite visible. The baseband signal processor processes the signal samples to generate the satellite signal channel impulse response for a number of Doppler frequency shifts. This results in a two-dimensional delay-Doppler map of satellite signal responses from which the baseband signal processor extracts the code time and carrier phase and frequency parameters as well as navigation data for timing, positioning, and environment mapping in the data processor.

21 Claims, 12 Drawing Sheets

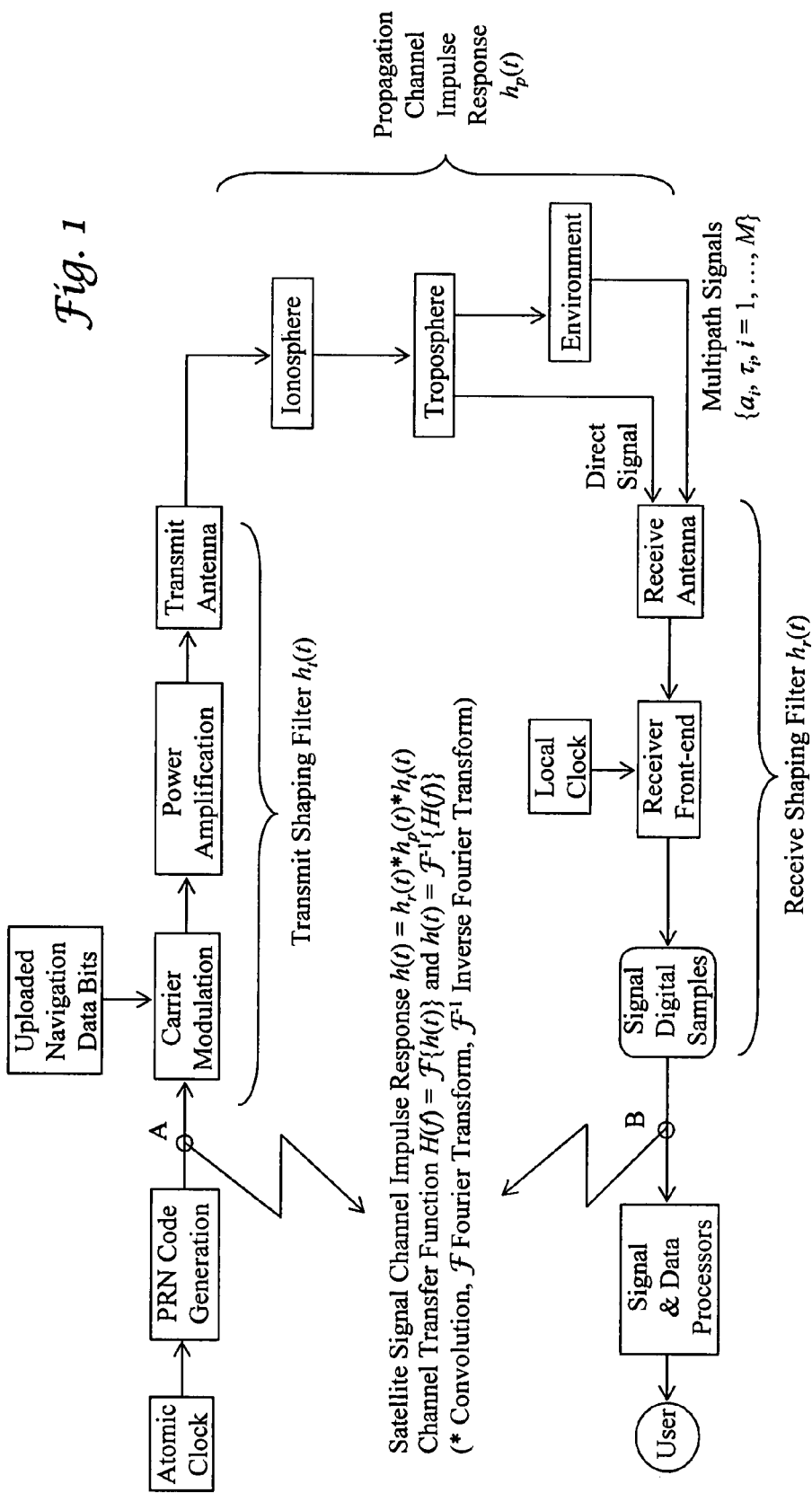

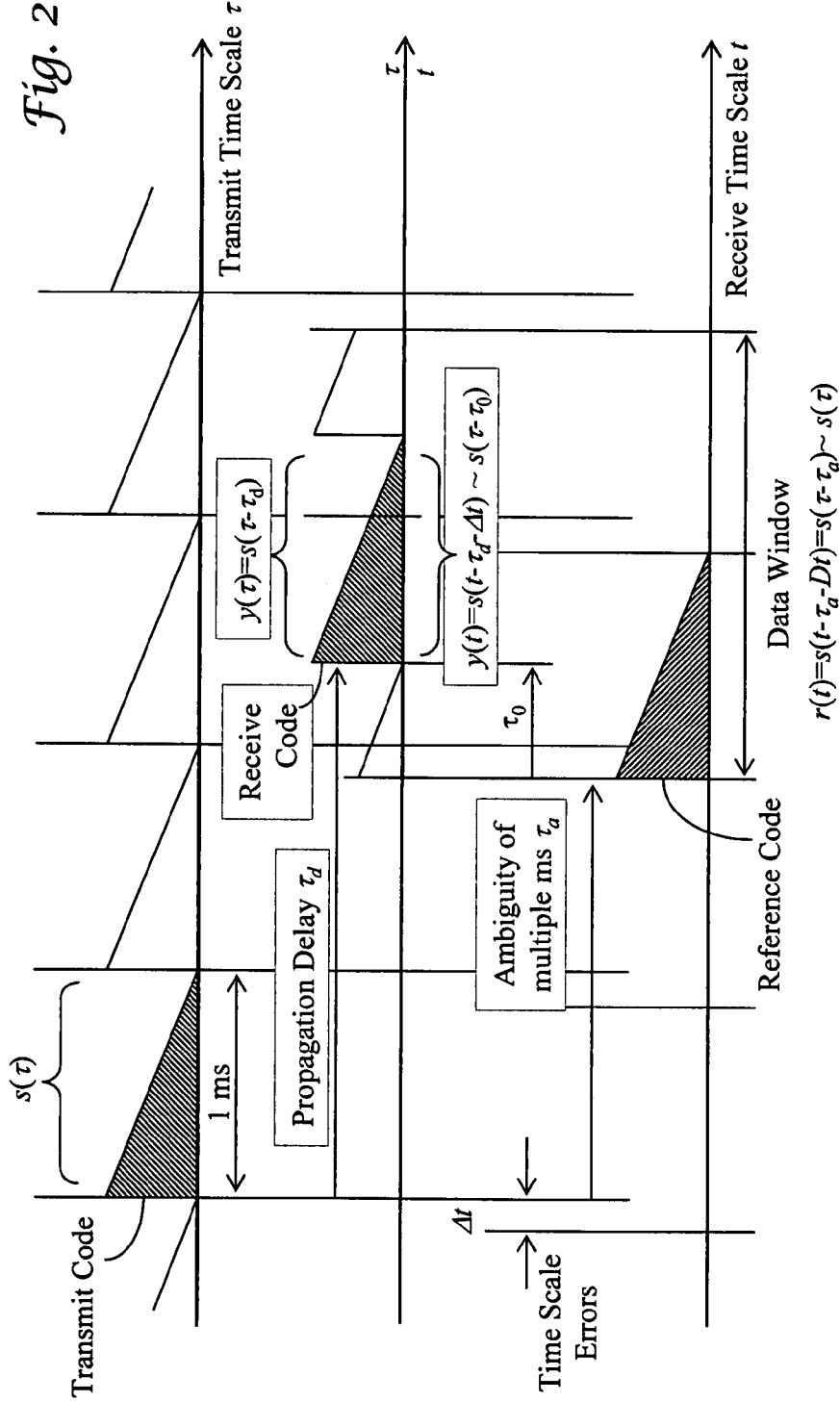

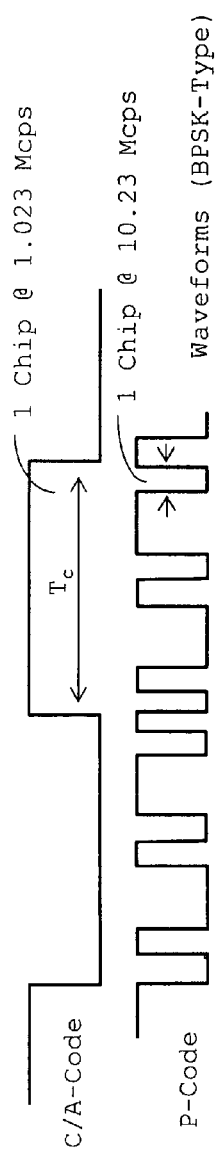
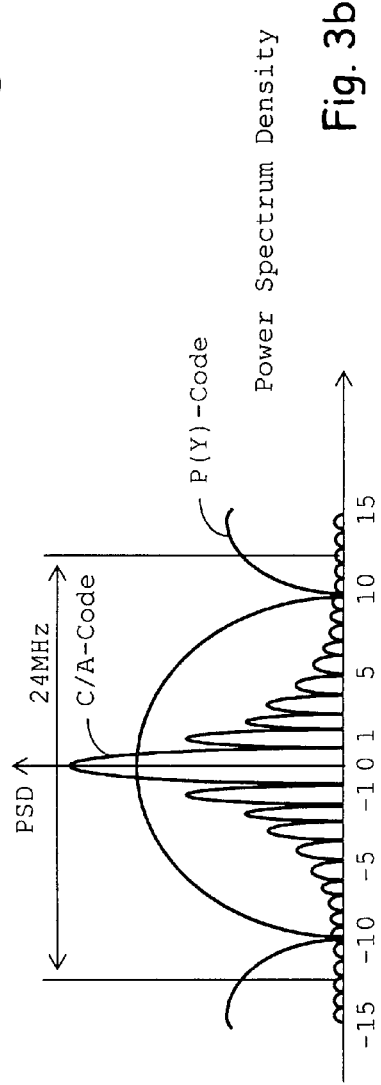
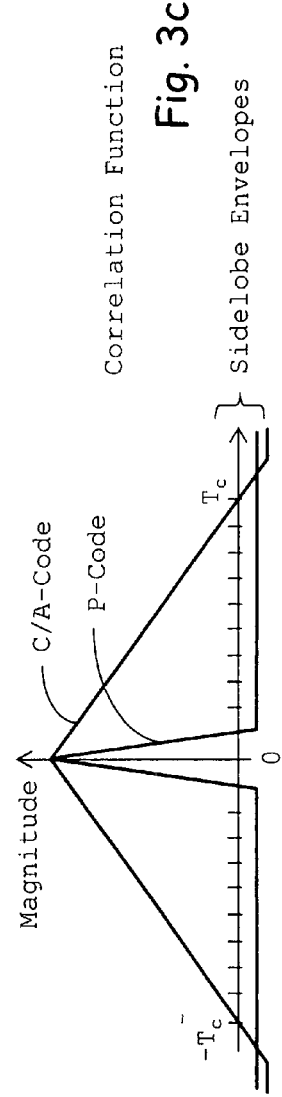
Fig. 3a Waveforms (BPSK-Type)
Fig. 3b Power Spectrum Density
Fig. 3c Correlation Function

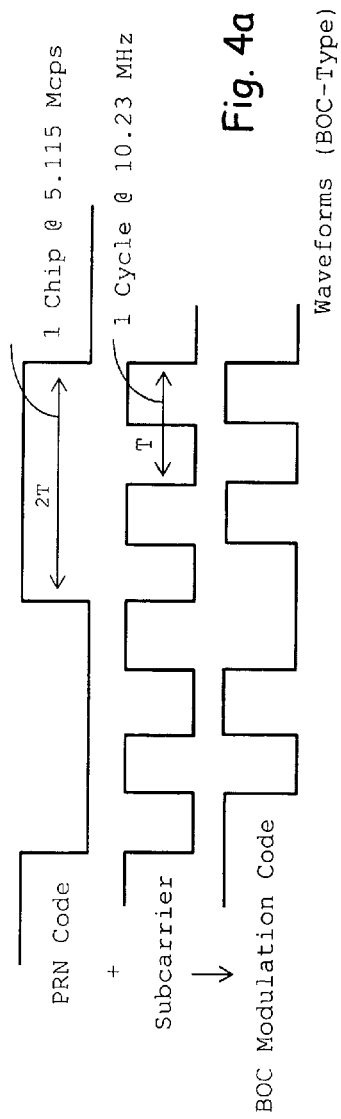
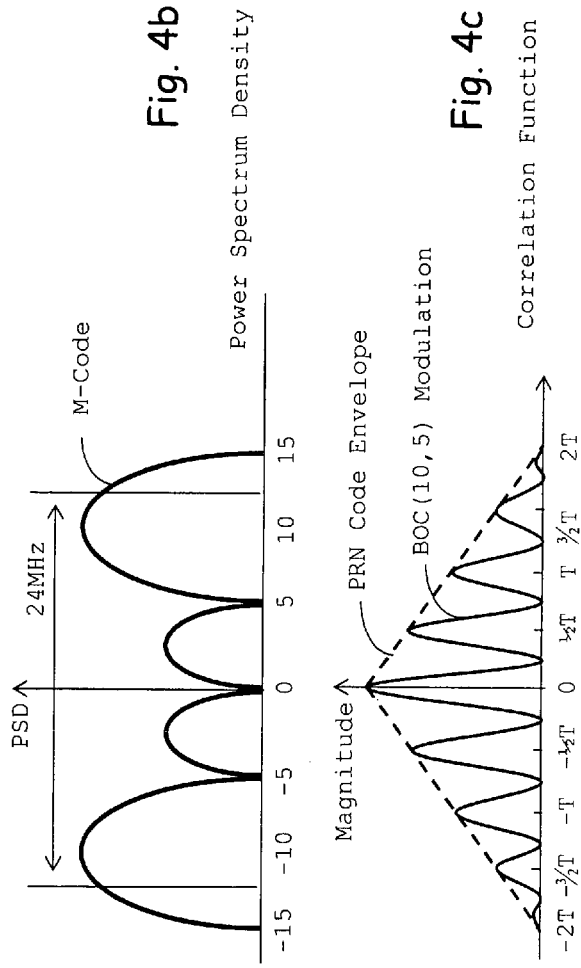
Fig. 4a  Waveforms (BOC-Type)
Fig. 4b  Power Spectrum Density
Fig. 4c  Correlation Function

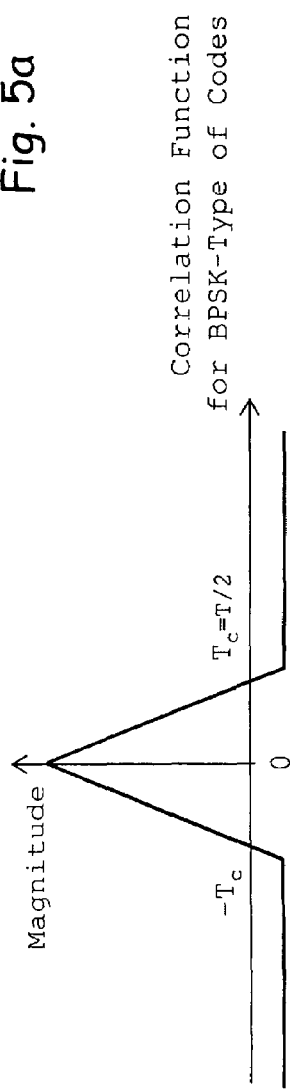
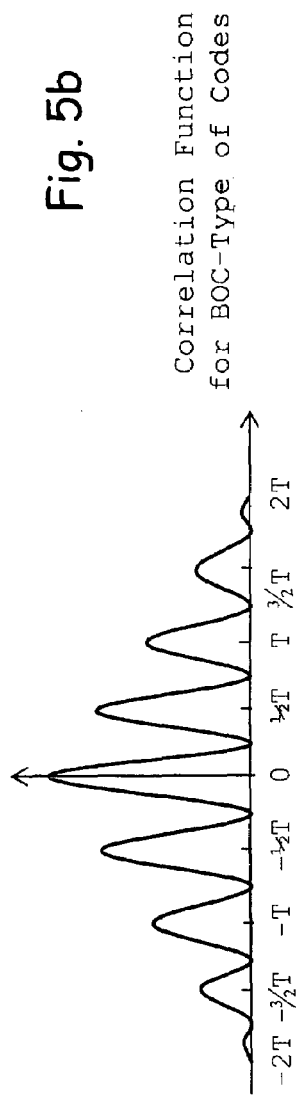
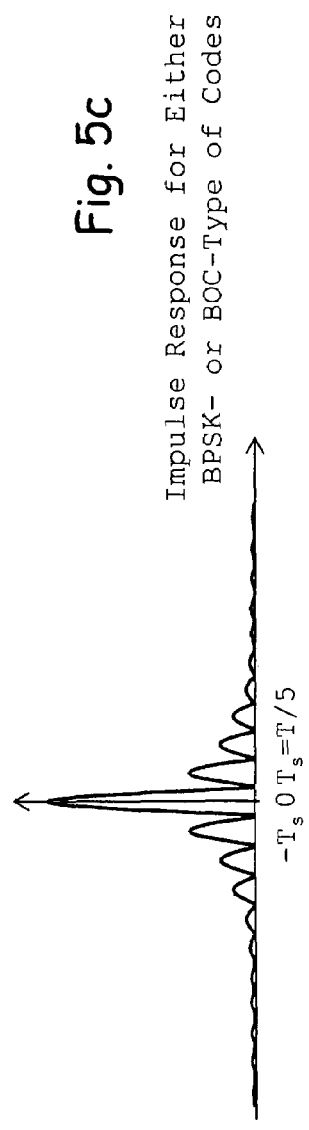
Fig. 5a  Correlation Function for BPSK-Type of Codes
Fig. 5b  Correlation Function for BOC-Type of Codes
Fig. 5c  Impulse Response for Either BPSK- or BOC-Type of Codes

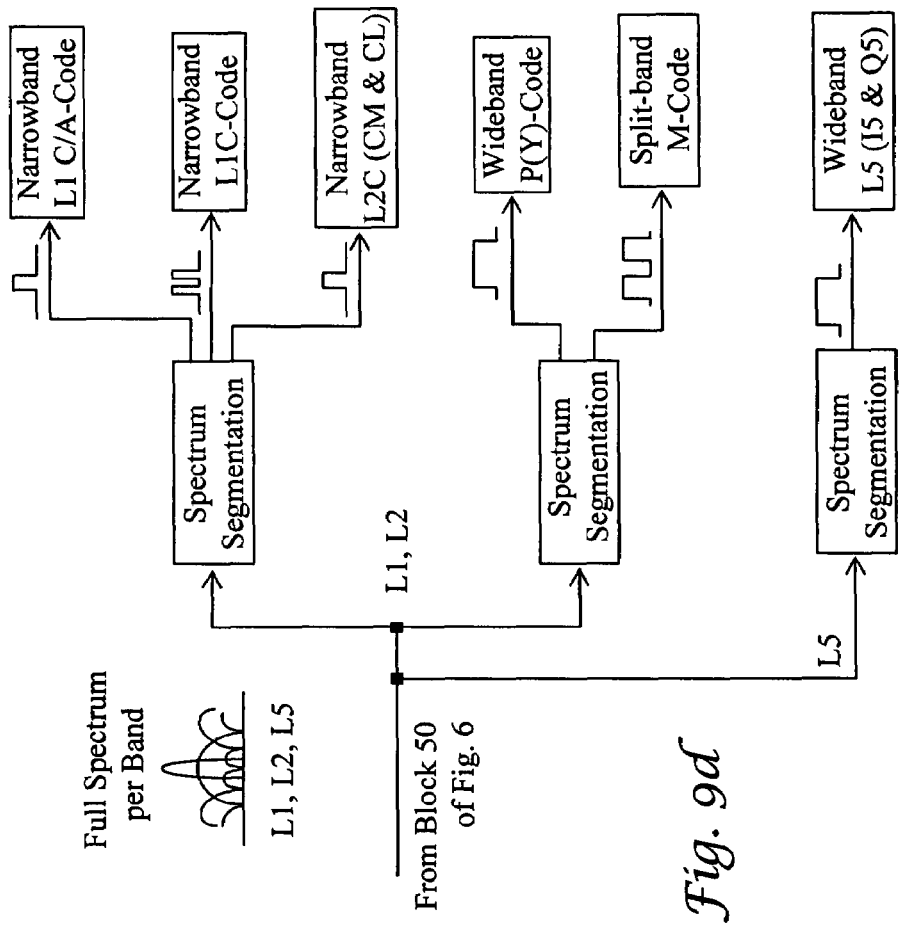
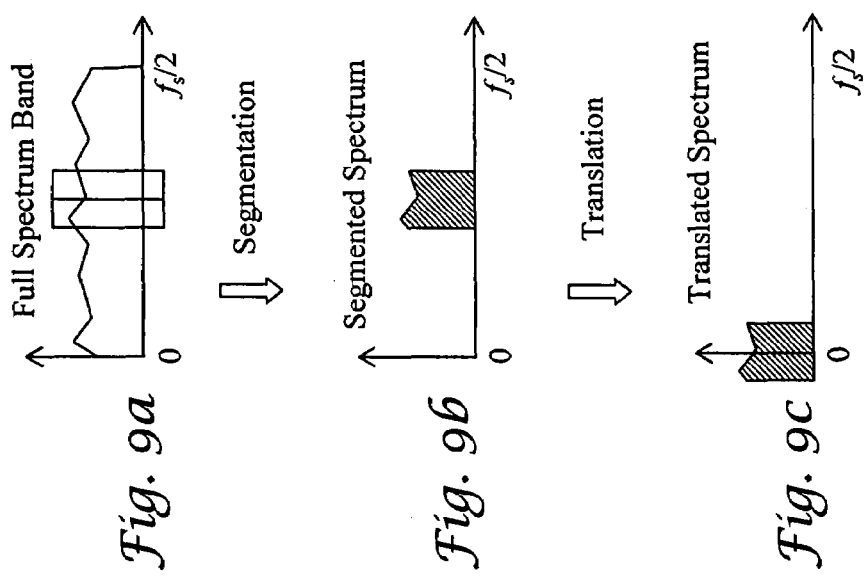
Fig. 9a
Fig. 9b
Fig. 9c
Fig. 9d

Grid-Tracking of the Present Invention

Conventional Point-Tracking

US 7,471,241 B1

GLOBAL NAVIGATION SATELLITE SYSTEM (GNSS) RECEIVERS BASED ON SATELLITE SIGNAL CHANNEL IMPULSE RESPONSE

DOCUMENT DISCLOSURE REFERENCE

This application claims priority of Disclosure Documents No. 519,241, filed Oct. 1, 2002; Disclosure Document No. 542,439, filed Dec. 1, 2003; Disclosure Documents No. 562,407, filed Oct. 12, 2004; Disclosure Document No. 565,005, filed Nov. 10, 2004; and Disclosure Document No. 567,097, filed Dec. 22, 2004.

BACKGROUND OF THE INVENTION

1. Field of the Invention

The present invention relates to devices and methods for Global Navigation Satellite System (GNSS) receivers. More particularly, the present invention system relates to acquiring and tracking GNSS signals and to extracting time and frequency parameters thereof, as exemplified by the direct sequence spread spectrum (DS/SS) signals used by the operational U.S. NAVSTAR Global Positioning System (GPS), the Russian Global Navigation System (GLONASS) and the planned European GALILEO System, for positioning, timing, and other measurement applications.

2. Description of the Prior Art

The NAVSTAR Global Positioning System (GPS) will play an important role in the future global navigation satellite system (GNSS). Other important parts of the GNSS may include the Russian Global Navigation Satellite System (GLONASS) and the European GALILEO System currently under construction. The today fully operational GPS, which is maintained by the government of the United States of America, is also undergoing significant modernization in its space and control segments with new user equipment being developed as well.

GPS radio navigation relies upon a constellation of twenty four satellites that are in six different orbital planes around the earth. A navigation solution is obtained through measurements of propagation delay times of the radio signals broadcast by the orbiting satellites to a user. Normally, a user must receive signals from at least four satellites in order to solve for the variables of longitude, latitude, altitude and time that are needed to precisely determine location.

Each GPS satellite transmits a radio signal at several frequencies including 1575.42 MHz (referred to as L1) and 1227.60 MHz (L2) and soon 1176.45 MHz (L5). Each radio signal carries information on its in-phase and quadrature components. Each carrier signal component is phase-modulated with at least one pseudo random number (PRN) code, known as the spectrum spreading code. Some are further modulated with a navigation data message that provides the precise satellite orbital, clock, and other information. Each spectrum-spreading code is unique for a satellite and is used as the identifier for that satellite. Since GPS satellites are equipped with and controlled by a set of ultra precise atomic oscillators, the GPS signal carrier phase and the modulating codes are exactly the reading of the onboard atomic clock's GPS time at which the signal is transmitted. As a result, acquisition of a GPS satellite signal and decoding its code provides the exact knowledge of the GPS satellite orbital position and the time at which the received signal was transmitted.

When traveling from a GPS satellite to a near earth surface user, the GPS signal experiences a propagation delay about 76 ms. The length of the propagation delay directly relates to the distance between the GPS satellite at transmission and the user at reception and is affected by the presence of ionosphere and troposphere and some weather conditions. Due to the relative motion between the transmitting satellite and the user, the GPS signal is either stretched or squeezed at reception, as compared to its original form at transmission. This is the so-called Doppler effect, and the change incurred to the signal is the Doppler frequency shift.

A GPS receiver is used to measure the propagation delay (range) and Doppler frequency shift (range rate) of each received signal and to demodulate the navigation data. Since the transmission time is embedded in the signal carrier and code phase, when a locally generated copy of the signal carrier with code (called the reference or replica) is so adjusted to match up with the incoming signal in both time and frequency and phase, it duplicates the satellite clock reading at transmission (a transmission time tag). Each GPS receiver has its own clock, albeit inaccurate, and uses it to mark the signal at reception relative to this local time base (a reception time tag). The difference between the two time tags is a measurement of the signal propagation delay and the range to each satellite is then calculated by multiplying each delay by the speed of light subject to some corrections.

A successful correlation between the reference code and the incoming signal identifies which GPS satellite signal is being received. This also removes the spectrum-spreading code and this despreading process increases the signal to noise ratio (SNR) and allows the only-remaining navigation data bits to be demodulated. The navigation data bits provide the precise orbital location of the satellite and coefficients for error-correcting formulas. The location and time of the user are then found by solving known equations that incorporate the measured range to the known location of the GPS satellites.

A typical GPS receiver consists of four subsystems. Those subsystems include a radio frequency (RF) front-end with a low noise-amplified antenna, a baseband signal processor, a navigation data processor, and a user interface. The RF front-end down converts the GPS signal from the RF at a GHz range to an intermediate frequency (IF) at a MHz range suitable for sampling and quantization. A conventional baseband signal processor has twelve or more identical tracking channels, each assigned to a GPS satellite in view and to new satellites emerging above the horizon. Each tracking channel is made of a code tracking loop and a carrier phase or frequency tracking loop. Code and carrier tracking loop in turn contains mixers, accumulate and dump (i.e., early, prompt, late corr-elators for both in-phase and quadrature components), code delay and carrier phase/frequency error discriminators, loop filters, code and carrier numerical controlled oscillators (NCOs), and code and carrier generators, respectively. Code phase and carrier phase/frequency measurements are taken from the tracking channels, from which pseudorange, delta range, and integrated beat carrier phase observables are generated. In addition to code and carrier tracking loops closure at a kHz range, the baseband signal processor also conducts navigation data demodulation and GPS observable generation at appropriate rates. Finally, the navigation data processor operates on raw observables with a Kalman filter or a least-squares estimator at a several Hz range for GPS satellite orbit calculation, navigation solution, and data input/output to the user.

Since the inception, GPS receiver technologies have steadily progressed and made transitions from analog to digital, from single-channel sequential-multiplexing to multiple-channel parallelism, and from GPS-alone to an integrated GNSS receiver. These prior art GPS receivers share a common architecture composed of two separate local loops. In the downstream is a navigation loop and in the upstream are a delay-locked loop (DLL) and a phase/frequency-locked loop (PLL/FLL), which are closed by software around correlators.

At the heart of prior art GPS receivers are the correlators implemented either in hardware or software which produce the correlation (or the mainlobe of it) of the underlying PRN spreading codes. Clearly the shape of the correlation function depends on the particular PRN codes used. For example, the binary phase shift keying (BPSK) modulation code has a single correlation peak whereas the binary offset carrier (BOC) modulation code has a mainlobe and several sidelobes that do not die down quickly. For the BPSK type of codes, the ideal correlation function is a triangle with its base being a code chip wide on either side (e.g., ±300 m for the GPS C/A-code and ±30 m for P-code). Any multipath signals with an additional delay shorter than one code chip will interfere with the correlation of the direct signal, distorting its correlation function shape and leading to ranging errors. For the BOC type of codes such as the GPS M-code, on the other hand, extra special hardware and software have to be used to deal with sidelobes to avoid missing detection, false acquisition, and lock onto a sidelobe with biased measurements.

A need therefore exits for a novel GNSS receiver architecture and its enabling signal processing techniques that are less sensitive to multipath and do not require extra hardware and/or software for operation under different spreading codes. This need is met by the present invention as described and claimed below.

SUMMARY OF THE INVENTION

A Global Navigation Satellite System (GNSS) receiver and associated method for the reception and processing of GNSS signals from a plurality of GNSS satellites to produce GNSS signal code time and carrier phase and frequency parameters, leading to navigation solutions and propagation and environment characteristics. The GNSS receiver includes an antenna and an analog front-end to intercept the incoming radio-frequency signal and to convert it to an appropriate intermediate frequency for digital sampling. A baseband signal processor is organized into functionally identical channels, each dynamically assigned to a different satellite visible. The baseband signal processor processes the signal samples to generate the satellite signal channel impulse response for a number of Doppler frequency shifts. This results in a two-dimensional delay-Doppler map of satellite signal responses from which the baseband signal processor extracts the code time and carrier phase and frequency parameters as well as navigation data. A data processor, coupled to the baseband signal processor, operates on the signal code time and carrier phase frequency parameters and navigation data from a plurality of GNSS satellites to produce a navigation solution by a Kalman filter or a least-squares estimator. It also utilizes the estimated satellite signal channel impulse response, satellite orbital position, and user navigation solution to obtain the propagation and environment characteristics.

BRIEF DESCRIPTION OF THE DRAWINGS

For a better understanding of the present invention, reference is made to the following description of an exemplary embodiment thereof, considered in conjunction with the accompanying drawings, in which:

FIG. 1 is a schematic illustrating major components of a satellite signal channel and the impulse response thereof;

FIG. 2 is a graphic representation of timing relationships between transmit and receive time scales as well as receive and reference codes within a data window;

FIGS. 3a, 3b, and 3c are a graphic representation of the waveforms (FIG. 3a), power spectrum density (FIG. 3b), and correlation function (FIG. 3c) for a BPSK modulation code;

FIGS. 4a, 4b, and 4c are a graphic representation of the waveforms (FIG. 4a), power spectrum density (FIG. 4b), and correlation function (FIG. 4c) for a BOC modulation code;

FIGS. 5a, 5b, and 5c are a graphic comparison of the correlation function for BPSK- and BOC-types of codes (FIG. 5a and FIG. 5b) and the impulse response for either BPSK- or BOC-type of codes (FIG. 5c);

FIGS. 9a, 9b, 9c, and 9d are a schematic of an exemplary embodiment of the method steps of spectrum segmentation (FIG. 9b) and translation (FIG. 9c) for full-band multi-code processing (Figs. a and d) in accordance with the present invention;

DETAILED DESCRIPTION OF THE INVENTION

Figure 6:
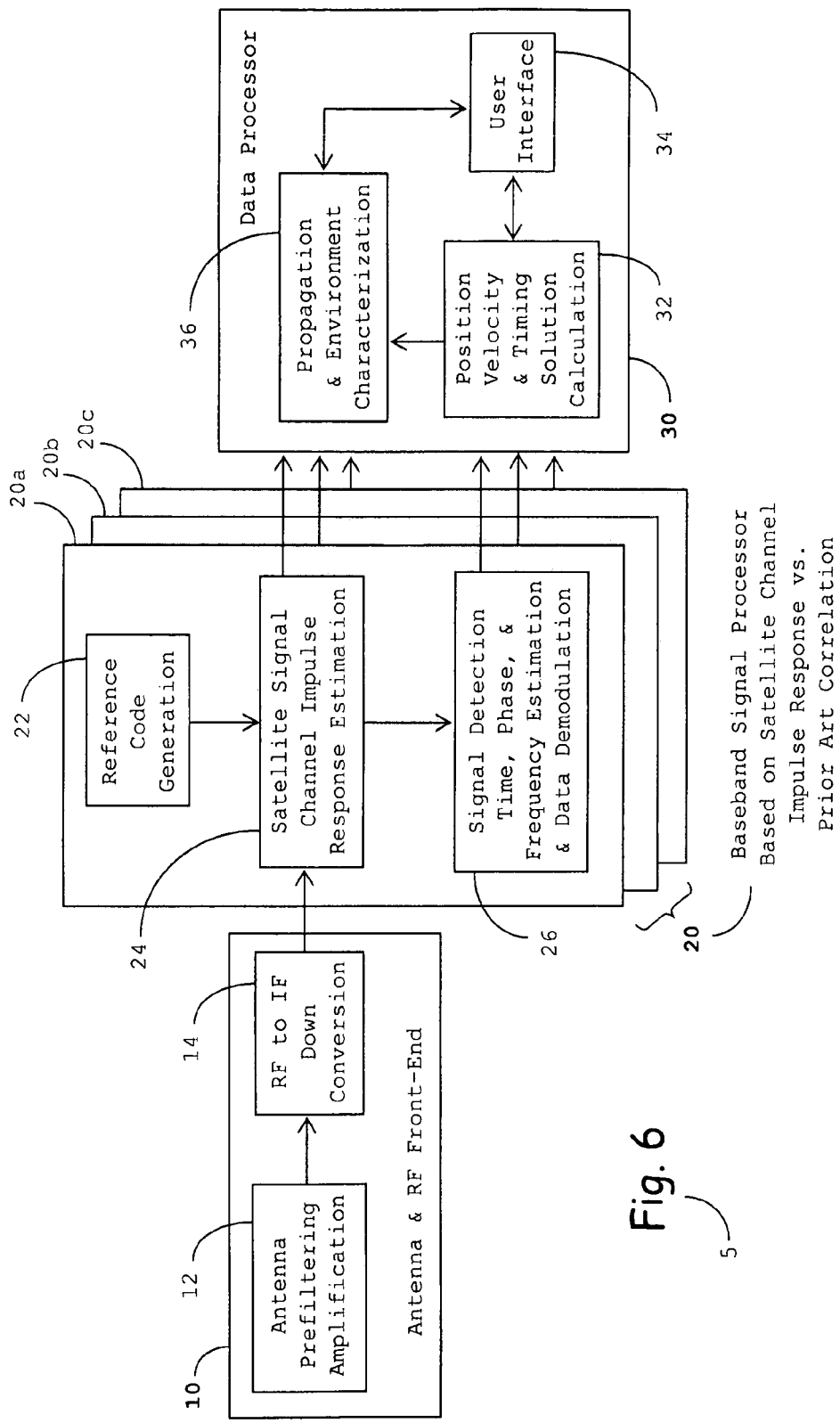
FIG. 6 is a schematic illustrating an exemplary embodiment of the overall architecture of the present invention system and method.

Although the present invention system and method can be used for the acquisition and tracking of many direct-sequence spread-spectrum (DS/SS) signals as used in GNSS, the present invention system and method are particularly well suited for use with the acquisition and tracking of signals from GPS satellites. Accordingly, an exemplary embodiment of the present invention will be described in an application of acquiring and tracking signals from GPS satellites with modernization signals in the presence of multipath.

Each satellite in the GPS constellation keeps time with very stable atomic clocks aboard, which are further maintained to ensure high accuracy with high-order corrections. The satellite orbit is also accurately estimated by a network of ground monitoring stations around the globe and its prediction is uploaded to the satellite as almanac and ephemeris for later broadcast to users in the form of navigation data.

Referring to FIG. 1, the navigation data bits are modulo-2 added with the spreading code chips and the resulting binary stream is modulated onto the RF carrier. The carrier cycles and code chips can be viewed as readings off the atomic clock ticks with unambiguous time marks embedded in the navigation data. By proper demodulation of the received signal, a user is therefore able to determine when a particular signal has left the satellite antenna and where.

Prior to leaving the satellite antenna, the baseband signal (i.e., the PRN codes) passes through a series of hardware components for filtering, frequency translation, and power amplification. The process is characterized by the transmit shaping filter in the form of the impulse response $h_t(t)$ or the transfer function $H_t(f)$ as shown in the upper portion of FIG. 1. The two forms of representation are related by $H_t(f)=F\{h_t(t)\}$ and $h_t(t)=F^{-1}\{H_t(f)\}$ where $F\{\bullet\}$ is the Fourier transform and $F^{-1}\{\bullet\}$ is the inverse Fourier transform.

After leaving the satellite antenna, the GPS signal propagates at a speed of light in the beamed direction and reaches a user antenna after having traveled the distance separating the satellite antenna at transmit and the receiver antenna at reception (i.e., the range delay). However, some extra delay is impacted to the signal as it traverses the ionosphere and troposphere, which may further induce some frequency spread and add noise of defined characteristics. The unknown ionospheric and tropospheric errors can be eliminated to a large extent by modeling, differential correction, and/or dual-frequency processing.

What is actually intercepted by the receiver antenna is the sum of the direct signal from the satellite and those reflected from nearby objects illuminated by the same direct signal, called the multipath signals or multipath for short. The specular type of multipath is more harmful than the diffuse type for timing measurement. Except for rare cases where the direct signal is blocked or attenuated by foliage for instance, the multipath is always weaker and later than the direct signal because it travels longer distance and the reflection coefficient is less than unity. Assume that there are M specular multipath signal components, each being further delayed relative to the direct signal by $\tau_i$ with a complex coefficient $\alpha_i=|\alpha_i|\exp(-j\theta_i)$ for $i=1, \tau_i$, M. Referring to FIG. 1, the propagation channel impulse response, denoted by $h_p(t)$, and its transfer function, denoted by $H_p(f)$, are given by:

$$h_p(t) = \alpha_0\delta(t-\tau_0) + \sum_{i=1}^{M}\alpha_i\delta(t-\tau_0-\tau_i) \quad (1)$$

$$H_p(f) = \alpha_0 e^{-j2\pi f\tau_0}\left(1 + \sum_{i=1}^{M}\beta_i e^{-j2\pi f\tau_i}\right) \quad (2)$$

where $\beta_i=\alpha_i/\alpha_0$, $H_p(f)=F\{h_p(t)\}$ and $h_p(t)=F^{-1}\{H_p(f)\}$.

The received signal is down-converted from RF to IF by stages of mixing with local oscillators (LO) at appropriate frequency with bandpass filtering and amplification between stages to a form suitable for sampling. Referring to FIG. 1, this process is characterized by the receive shaping filter impulse response $h_r(t)$ or equivalently the transfer function $H_r(f)$.

Referring to FIG. 1, the GPS signal from its generation at Point A to the start of digital processing at Point B is completely described by the satellite signal channel impulse response h(t). The satellite signal channel impulse response h(t) is the convolution of the transmit shaping filter $h_t(t)$, the propagation channel impulse response $h_p(t)$, and the receive shaping filter $h_r(t)$ as:

$$h(t)=h_r(t)*h_p(t)*h_t(t) \quad (3)$$

where * stands for convolution. Equivalently, the satellite signal channel transfer function H(f) is the product of the transmit shaping filter transfer function $H_t(f)$, the propagation channel transfer function $H_p(f)$, and the receive shaping filter transfer function $H_r(f)$ as:

$$H(f)=H_r(f)H_p(f)H_t(f) f\in F \quad (4)$$

where F is the set of frequency bins at which the transfer functions are evaluated. Clearly the multiplication in the frequency domain of Eq. (4) is much simpler than the convolution in the time domain of Eq. (3).

The process of transmission and reception of a particular waveform is illustrated in FIG. 2. For simplicity, we depict a periodic code such as the GPS C/A-code but the principle is valid for all other GNSS signals. Referring to FIG. 2, the time scale maintained aboard a satellite is denoted by $\tau$ and a transmit code sequence $s(\tau)$ is graphically represented by a triangle in FIG. 2 with the right angle edge aligned to the ms boundary. The signal arrives at the receiver after a propagation delay $\tau_d$ such that $y(\tau)=s(\tau-\tau_d)$.

The receive time scale is denoted by t, which differs from the transmit time scale $\tau$ by a time error $\Delta t$. When expressed in the receive time scale, the received signal becomes $y(t)=s(t-\tau_d-\Delta t)$. The same received signal can also be expressed relative to the start of a data window. Although the arrival time $\tau_0$ is well-defined, there is an ambiguity of multiple milliseconds, denoted by $\tau_a$, if the data window is aligned with the local ms boundary. However, this ambiguity can be solved once the navigation data are demodulated or by other means. From the viewpoint of signal acquisition and tracking, it suffices to consider as if the signal were transmitted at the beginning of the data window and would arrive after a delay of $\tau_0$.

Prior art receivers create a reference code r(t) similar to the code generated aboard the satellite $s(\tau)$ but shift the starting point in time, that is, $r_\rho(t)=s(t-\rho)$. For successive data windows, $\rho$ is adjusted progressively so as to match up with the received direct signal $y(t)=s(t-\tau_0)$. The correlation between the received direct signal y(t) and the reference code r(t) can be written as:

$$c(\rho) = y(t) \otimes r_\rho(t) = \sum_{t=0}^{T_i} s(t-\tau_0)s(t-\rho) = c_0(\rho-\tau_0) \quad (5)$$

where $\otimes$ stands for correlation, $T_i$ is the integration interval, and $c_0(\bullet)$ is the autocorrelation of s(t). The noise term is omitted from Eq. (5) for simplicity. The correlation function is evaluated for a selected set of $\rho\in T$. When $\rho=\tau_0$, the reference code $r_\rho(t)$ coincides with the received y(t), therefore producing the maximum correlation value as its peak.

Mathematically, the correlation of Eq. (5) can be calculated in the frequency domain as:

$$c(\rho)=F^{-1}\{C(f)\} \quad (6a)$$

$$C(f)Y(f)R^*(f)=C_0(f)e^{j2\pi f(\rho-\tau_0)} \quad (6b)$$

where the superscript * stands for complex conjugate and $C_0(f)=F\{c_0(t)\}=|S(f)|^2$, $Y(f)=F\{y(t)\}=S(f)\exp(-j2\pi f\tau_0)$, $R_\rho(f)=F\{r_\rho(t)\}=S(f)\exp(-j2\pi f\rho)$ and $S(f)=F\{s(t)\}$ are the Fourier transform for these four functions, respectively. Once again the time-domain convolution in Eq. (5) is converted to the frequency-domain multiplication in Eq. (6b), which is simpler to manipulate provided that the transforms are available.

Correlation is carried out by comparing two signals on a sample by sample basis over a certain time interval, one being the received signal and the other the locally generated reference code. The reference code is adjusted in time and frequency so as to match up with the received signal and when this is achieved, the reference code is viewed as a replica of the incoming signal with its parameters as an estimate of the received signal's. The correlation interval is typically chosen to be the code length if it is periodic such as the GPS C/A-code of 1 ms. For long codes such as the P(Y)-code and aperiodic codes such as the M-code, the correlation interval is chosen to provide an appropriate processing gain in tradeoff with latency and complexity.

When correlation is calculated by hardware correlators, the start and end of correlation integration are triggered by the reference code generator as it reaches a predefined state. The incoming signals received in real time during this interval are compared with the reference code at a chosen code phase per correlator. Multiple correlators are therefore required to evaluate the correlation at different code phases in parallel.

In contrast to such a sequential scheme where different code phases are evaluated with different data over time, software correlators perform block-repetitive operations. That is, a block of signal samples are first stored in the memory and then the same block of signal samples are accessed at a high speed many times, each for correlation with the reference code at a different code phase.

The waveform, the power spectrum density function, and the autocorrelation of an exemplary maximum-length PRN code and a BOC modulation code are shown in FIGS. 3 and 4, respectively. The PRN code in FIG. 3a has a binary value of ±1 per chip of length $T_c$. Its power spectrum density function in FIG. 3b is of the sinc-shape with the first nulls at $\pm 1/T_c$. The autocorrelation function in FIG. 3c is a triangle ideally without rounding at the peak by limited bandwidth.

A BOC modulation code, on the other hand, is the product of a PRN spreading code and a square wave subcarrier, each having a binary value of ±1, and is denoted BOC(s, p) where the subcarrier has a frequency of $sf_0$ and the chipping rate of the PRN code is $pf_0$ with $f_0$=1.023 MHz being the reference frequency. The waveform of a BOC(10, 5) code is shown in FIG. 4a. Its power spectrum density function is split toward the edges as shown in FIG. 4b and this enables it to co-exist with other codes in the same frequency band for reduced cross interference. With more signal energy near the edge and over a wider spectrum, the BOC modulation offers better performance in terms of accuracy against noise and multipath. However, the autocorrelation function as shown in FIG. 4c has several sidelobes and nulls around the main peak where the first few lobes are not much lower than the main peak. This presents the risk of repetitive picking up of local zeros (missed detections) or sitting on a sidelobe (false tracking with biased measurements). Extra hardware and software are required in prior art receivers to solve the problems.

Referring to FIG. 1, the waveform generated at Point A is known and can be duplicated with the reference code at Point B per data window except for an unknown ambiguity and an error between time scales (both resolved later as part of the navigation solution). When the incoming signal is received at Point B, instead of calculating the correlation between the incoming signal y(t) and the reference code r(t) per data window as commonly done in prior art receivers, it is the object of the present invention to compute the satellite signal channel impulse response h(t) from which to estimate the time of arrival $\tau_0$. This is advantageous as the processing is code waveform-independent.

Referring to FIG. 2, the Fourier transform of the received signal Y(f) is related to that of the reference code R(f) (=S(f) per data window) and the satellite signal channel transfer function H(f) by Y(f)=H(f)R(f) from which the satellite signal channel transfer function H(f) can be estimated as:

$$\hat{H}(f) = \frac{Y(f)}{R(f)} = \frac{Y(f)R^*(f)}{|R(f)|^2} = \frac{Y(f)S^*(f)}{|S(f)|^2} = \frac{C(f)}{C_0(f)} = \alpha_0 e^{-j2\pi f \tau_0} \quad (7)$$

for all f such that R(f)≠0. The corresponding impulse response is given by:

$$\hat{h}(t) = \alpha_0 \delta(t-\tau_0) \quad (8)$$

where δ(•) is the Dirac delta function with an infinite timing resolution power. However, Eq. (8) is valid only for the ideal case with an infinite signal bandwidth. In practice, the transmitted signal is bandpass-filtered and the receiver has a limited bandwidth. Without loss of generality, assume that the signal is sampled at the Nyquist rate $f_s$. The set of frequency bins is thus defined as F={$-f_s/2, \ldots, 0, \ldots, f_s/2$}. The actual estimated impulse response is:

$$\hat{h}(t) = K\alpha_0 \frac{\sin(\pi(t-\tau_0)f_s)}{\pi(t-\tau_0)f_s} \quad (9)$$

where K is a conversion constant.

According to Eq. (7), when the replica code spectrum $C_0(f)$ is constant over the frequency range of interest, the transfer function H(f) becomes identical to the correlation spectrum C(f) except for a scale factor. This requires the code to be truly random and white, which is difficult, if not impossible, to realize. That is why only pseudorandom number (PRN) codes and more recently chaotic signals are available. The spectrum division between Y(f) and R(f) actually performs a whitening operation. As shown in Eq. (7), $Y(f)/R(f)=Y(f)R^*(f)/|R(f)|^2$ wherein the conjugation removes the phase variation while the scaling normalizes the spectrum across the frequency range.

The first nulls of the estimated impulse response are at $t=\tau_0 \pm T_s$ with $T_s=1/f_s$ being the sampling interval as shown in FIG. 5c. It is of the sinc-function shape and with its mainlobe narrower than the correlation functions for the BPSK-type of codes in FIG. 5a and for BOC-type of codes in FIG. 5b, respectively. Consider a BOC(s, p) code sampled at $f_s=\kappa S f_0$. The first null for this BOC code correlation function is $T_{BOC}=\frac{1}{4}sf_0$. The first null for a BPSK code correlation function at an equivalent chipping rate of $pf_0$ is $T_{BPSK}=1/pf_0$. The first null for the impulse response at this sampling rate with the signal bandwidth up to one half of $f_s$ is $T_{IR}=1/\kappa s f_0$. For BOC(10, 5) with κ=5 (i.e., $f_s$=50 MHz), the mainlobe width of the impulse response is reduced to $T_{IR}/T_{BOC}=4/\kappa=\frac{4}{5}$ and $T_{IR}/T_{BPSK}=p/\kappa s=\frac{1}{10}$ of the correlation function of the BOC- and BPSK-type of codes, respectively. This provides significant improvement in timing accuracy and multipath performance over prior art receivers without any additional hardware.

When the correlation function is evaluated at discrete code phases with S being their spacing (in units of $T_s$), the location of the correlation peak rarely falls onto a sampling point. The peak location is usually obtained through interpolation. Fitting a quadratic curve to the maximum correlation value and its two adjacent values, denoted by $C_{m-1}, C_m,$ and $C_{m+1}$ in the ascending order of their indices, yields the interpolated peak at $\hat{\tau}_0=(m+\delta)S$ where $\delta$ is the offset relative to the middle point given by:

$$\delta = \frac{1}{2} \frac{|C_{m-1}| - |C_{m+1}|}{|C_{m-1}| + |C_{m+1}| - 2|C_m|} \quad (10)$$

Eq. (10) is similar in structure to the normalized early minus late correlation delay error discriminator popularly used in prior art receivers.

Similarly, interpolation can be applied to the estimated impulse response when it is sampled at discrete time with a sampling spacing of $S=T_s$. Denote the largest impulse response value by $h_m$ and its two adjacent values by $h_{m-1}$ and $h_{m+1}$. Further denote the larger value between $h_{m-1}$ and $h_{m+1}$ as $h_{m\pm1}=\max\{|h_{m-1}|, |h_{m+1}|\}$. The interpolated peak when fitted to the sinc-function is located at $\hat{\tau}_0=(m+\delta)S$ with:

$$\delta = \pm \frac{|h_m|}{|h_m| + |h_{m\pm1}|} \quad (11)$$

In addition to being waveform-independent, the use of impulse response in the present invention provides a better timing capability, thus more accurate ranging measurements, than the prior art correlation function particularly in the presence of multipath.

In the presence of multipath, a composite correlation is calculated as the sum of correlations of the direct signal and individual multipath components with the reference code. For simplicity, assume that $h_t(t)=\delta(t)$ and $h_r(t)=\delta(t)$ (i.e., $H_t(f)=1$ and $H_r(f)=1$). The composite correlation is given by:

$$c(t) = \alpha_0 c_0(t - \tau_0) + \sum_{i=1}^{M} \alpha_i c_0(t - \tau_0 - \tau_i) \quad (12)$$

$$C(f) = C_0(f)\alpha_0 e^{-j2\pi f \tau_0}\left(1 + \sum_{i=1}^{M} \beta_i e^{-j2\pi f \tau_i}\right) \quad (13)$$

where $c_0(t)$ and $C_0(f)$ are defined in Eqs. (5) and (6) and $\alpha_0$ and $\beta_i$ are defined in Eqs. (1) and (2).

For prior art receivers based on correlation, any multipath with a relative delay $\tau_i<(1+d)T_c$ where d is the spacing between correlators in units of $T_c$ will affect the adjacent correlation values $C_{m-1}$ and $C_{m+1}$ differently, thus introducing bias to the timing estimate in Eq. (10).

In the present invention, the satellite signal channel impulse response in the presence of multipath can be written as:

$$\hat{h}(t) = K\alpha_0\left(\frac{\sin(\pi(t-\tau_0)f_s)}{\pi(t-\tau_0)f_s} + \sum_{i=1}^{M}\beta_i\frac{\sin(\pi(t-\tau_0-\tau_i)f_s)}{\pi(t-\tau_0-\tau_i)f_s}\right) \quad (14)$$

$$\hat{H}(f) = \alpha_0 e^{-j2\pi f \tau_0}\left(1 + \sum_{i=1}^{M}\beta_i e^{-j2\pi f \tau_i}\right) \quad (15)$$

Only those multipath with a relative delay $\tau_i<2T_s$ will affect the adjacent impulse response values $h_{m-1}$ and/or $h_{m+1}$ in Eq. (11) for timing estimation. Since these are multipath that are very close to the direct signal, the induced timing error is less harmful than what is otherwise impacted to the prior-art correlation-based receivers. For instance, when the signal is sampled at five times the chipping rate, the multipath performance of the present invention is improved by a factor of 2.525 to 3.75 over the prior art receivers with a correlator spacing from 1/10 to 1/2 of a chip. Simulation results of the benefits are disclosed in the paper entitled "Multipath Desensitized Delay Estimation with GPS Signal Channel Transfer Function Filtering," presented by the inventor at the 61st Annual Meeting of the Institute of Navigation in June 2005 in Cambridge, Mass., which is therefore incorporated into this specification by reference.

Referring to FIG. 6, an exemplary schematic of a novel GNSS receiver 5 based on the satellite signal channel impulse response is shown in accordance with the present invention. The receiver 5 is composed of an antenna & RF front-end block 10, a baseband signal processor 20, and a data processor 30. An antenna, prefiltering and amplification block 12 captures GNSS signals that are transmitted by a plurality of GNSS satellites in view and the captured signals are prefiltered, low-noise amplified, and then coupled to a radio frequency (RF) to intermediate frequency (IF) down conversion block 14. The IF signal is then passed over to a baseband processor 20. The techniques for the design and construction of antennas and RF front-ends that possess the characteristics relevant to the present invention are well known to those of ordinary skills in the art.

The baseband processor 20 is organized into functionally identical channels, each dynamically assigned to a different GNSS satellite being tracked. To simplify, only three of such channels 20a, 20b, and 20c are depicted in the figure.

In accordance with the present invention, FIG. 6 illustrates a novel method to construct the baseband signal processor 20 using the satellite signal channel impulse response instead of the prior art correlation. The baseband signal processor 20 performs three essential functions that are represented by three blocks. The first function is the reference code generation 22. The second function of the baseband signal processor 20 is the satellite signal channel impulse response estimation 24. Lastly, the third function is the signal detection, time, phase, and frequency estimation, and data demodulation 26. The details of these components are later described with reference to subsequent figures.

The data processor 30 in accordance with the present invention has an additional functionality of propagation and environment characterization 36 with the estimated signal channel impulse response 24 from the baseband signal processor 20 in addition to the usual position, velocity, and timing solution calculation 32. The latter processes the signal parameters 26 obtained by the baseband signal processor 20. The data processor 30 also accepts commands from and presents the navigation and analysis data to the user via a user interface 34.

There are a number of different ways that can be used to estimate the satellite signal channel impulse response for the baseband signal processor 20. Indeed, the estimation can be done either in the continuous time with analog devices or in the discrete time with digital circuitry. It can also be done in the time domain or in the frequency domain. The domain conversions can be carried out electronically with the Fourier transform implemented in software or in such hardware as field programmable gate array (FPGA) or electro-optically with Fourier optics for instance. An exemplary embodiment of the baseband signal processor 20 with the satellite signal channel impulse response estimated in an open-loop manner in the frequency domain in the discrete time is illustrated in FIG. 7 in accordance with the present invention.

Figure 7:
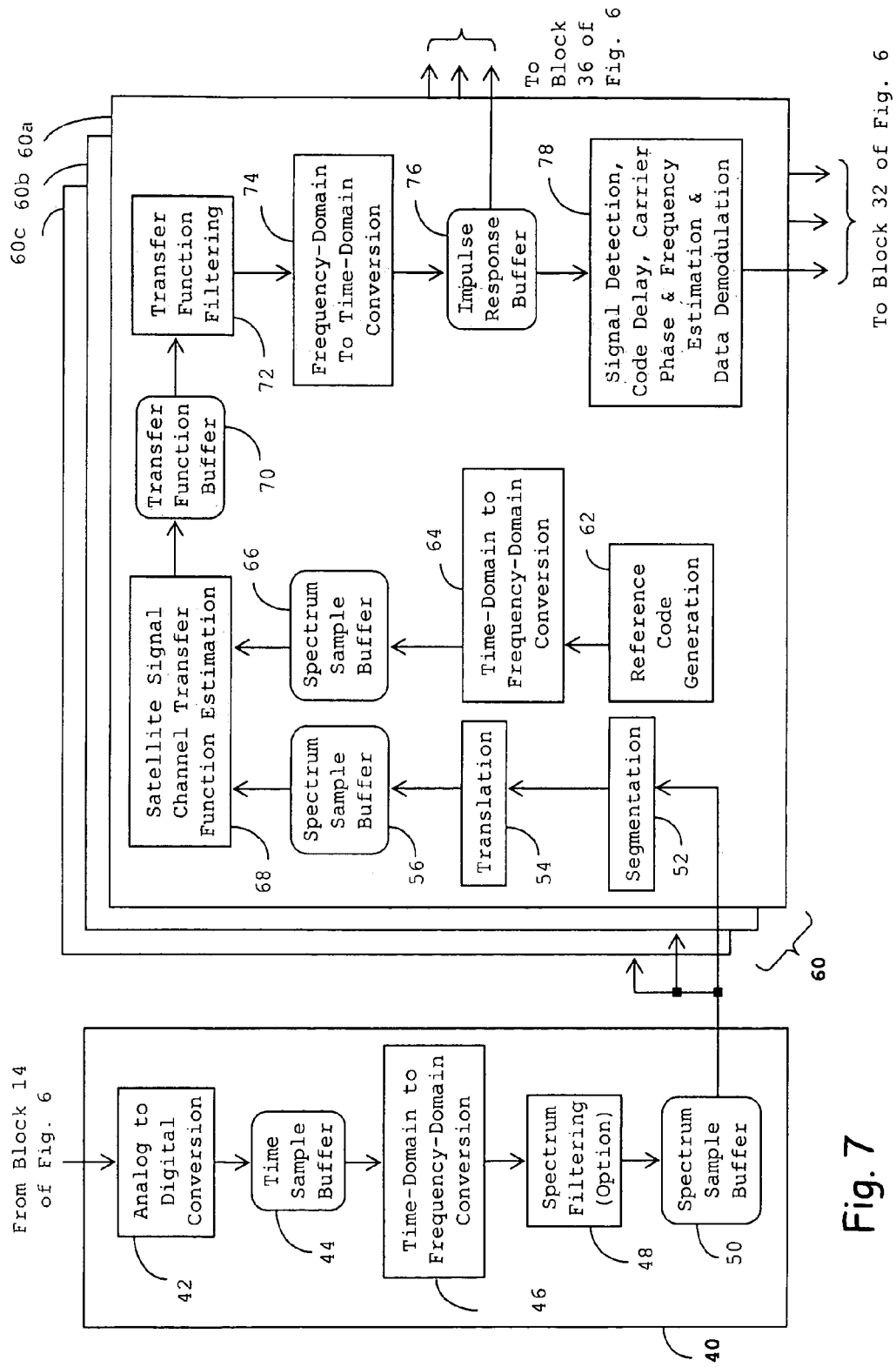
FIG. 7 is a schematic of an exemplary embodiment of a baseband signal processor based on an open-loop estimation method in accordance with the present invention.

Referring to FIG. 7, the incoming signal forward transformation subsystem 40 is made to be satellite-independent and contains three operation blocks and two data buffers. The IF signal from Block 14 in FIG. 6 is sampled and quantized by an analog to digital converter 42 with the samples temporarily stored in a time sample buffer 44. The time samples are passed through a time-domain to frequency-domain converter 46, followed by an optional spectrum filter 48. The frequency-domain data are temporarily stored in a spectrum sample buffer 50 for subsequent satellite-dependent processing in the subsystem 60. The domain conversion can be accomplished with the discrete-time Fourier transform (DFT) or one of its efficient implementations such as the fast Fourier transform (FFT) or by other means. The optional spectrum filtering 48 may include narrowband interference suppression, an exemplary schematic of which is disclosed in U.S. Pat. No. 6,407,699 B1 issued Jun. 18, 2002 to the present inventor, which has been incorporated by reference.

Figure 8A:
FIGS. 8a, 8b, 8c, and 8d are a graphic representation of the method steps of double-length incoming signal buffering (FIG. 8b) and reference code zero-padding to the double length (FIG. 8c) in the presence of data bit sign reversal (FIG. 8a) with circular shifting for code alignment (FIG. 8d) in accordance with the present invention.
Figure 8B:
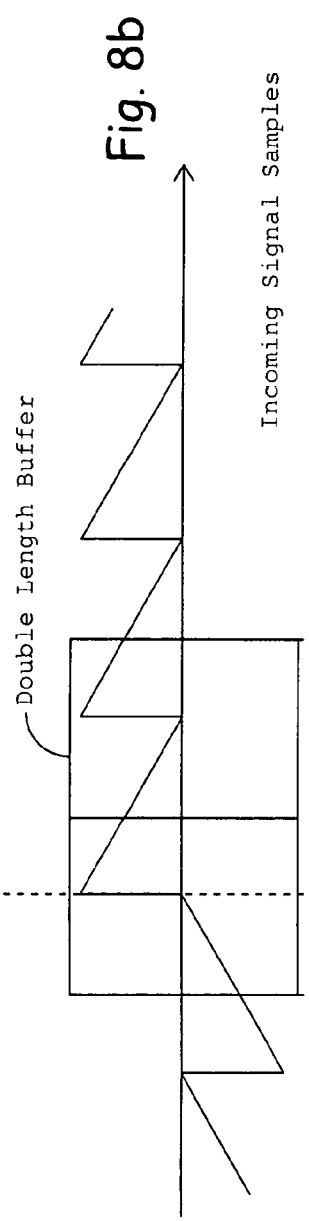
Figure 8C:
Figure 8D:
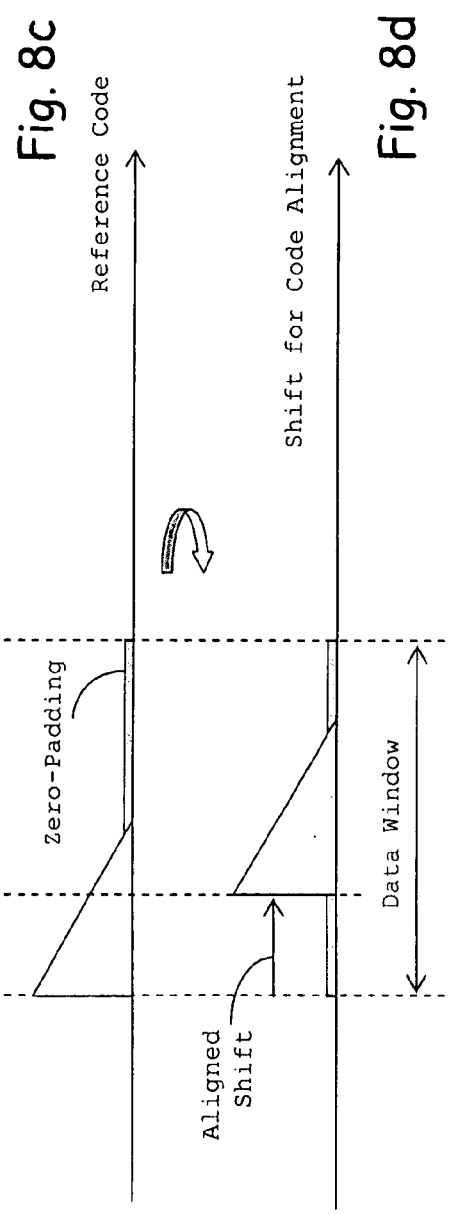

The size of the time sample buffer 44 is selected to be twice that of a correlation interval (also referred to as a double-length buffer), one half of which is replaced by new samples every correlation interval. The forward domain transformation is applied in the block 46 to the double-length buffer of incoming signal samples 44 per correlation interval when the underlying code is periodic as illustrated in FIG. 8b. The reference code generation 62 is per full period. This single length of code samples is then padded with zeros to the double length as illustrated in FIG. 8c. After the time-domain to frequency-domain conversion 64, the frequency samples are stored temporarily in another spectrum sample buffer 66. The reference code spectrum may be pre-calculated and stored in this buffer if the code is fixed and known in advance. By shifting the reference code to the right as illustrated in FIG. 8d, the reference code is aligned with the incoming signal in the double-length buffer along the boundary of millisecond, which can also be the boundary of a data bit and second in the incoming signal samples. In FIG. 8, a series of triangles are used to represent a periodic code. The change of data bit sign from +1 to −1 flips the periodic code triangles. For the particular case shown in FIG. 8a, this occurs in the middle of the first half of the data window of double correlation length. It is clear from the illustration that without such an alignment, a data bit sign reversal among the samples of one correlation interval can reduce and even nullify a perfectly matched correlation power. The alignment is indispensable to obtain the data bit sync and the subsequent frame sync for navigation data demodulation. It is also imperative for the generation of a one-pulse-per-second (1 pps) output. The principle for constructing the incoming signal buffer and reference code as illustrated in FIG. 8 for a short periodic code needs to be adapted for aperiodic and/or long codes. Techniques for such an adaptation are disclosed in the paper entitled "FFT Acquisition of Periodic, Aperiodic, Puncture, and Overlaid Code Sequences in GPS," presented by the inventor at the 14$^{th}$ International Technical Meeting of the Satellite Division of the Institute of Navigation in September 2001 in Salt Lake City, Utah, which is incorporated into this specification by reference.

As an additional advantage, the use of a double length buffer and replica zero-padding provides a refined frequency bin because the domain conversion interval is made longer than the actual code correlation interval. This is beneficial for residual Doppler removal using spectrum translation 54 to be discussed later. The correlation over an interval $T_i$ suffers from a loss of $\sin(\pi \Delta f T_i)/\pi \Delta f T_i$ when there is a frequency error of $\Delta f$ between the incoming signal and the reference carrier. It is customary to tolerate a power loss of 0.9 dB or less for $\Delta f < \frac{1}{4} T_i$. The frequency resolution produced by the use of a double length buffer (or longer) is $\frac{1}{2} T_i$ (or smaller) which, when used as the frequency search bin, satisfies the above maximum tolerable frequency error criterion.

Referring back to FIG. 7, the baseband signal processor architecture in accordance with the present invention provides a significant computational advantage in that the incoming signal transformation only needs to be calculated once but can be subsequently used to track all satellites in view. This offers the capability of full-band multi-code simultaneous processing of a satellite signal and even a full-spectrum processing capability when the antenna and RF front-end can capture wideband signals and the processors have the throughput to handle the high-speed digital samples.

Referring to FIG. 7, the satellite-independent incoming signal transformation subsystem 40 is followed by the satellite-specific processing subsystem 60, which consists of several duplications, each dedicated to a different satellite, three of which are shown in FIG. 7 as 60a, 60b, and 60c, respectively. The satellite-specific operation starts with the segmentation 52, which extracts the spectrum of a code of interest from the spectrum sample buffer 50 as illustrated in FIG. 9b. By manipulating index (memory address) of the full spectrum in FIG. 9a, segmentation applies ideal filtering so as to select the spectrum content pertaining to a particular code of interest. As illustrated in FIG. 9d, this includes narrowband lowpass filtering for L1 C/A-code and L2C (CM and CL)-code, narrowband bandpass filtering for L1C-code, wideband lowpass filtering for L1 and L2 P-code and L5 (I5 and Q5)-code, and wideband bandpass filtering for L1 and L2 M-code. Similar segmentation masks (ideal filters) can be designed for the European GALILEO system or other GNSS signals.

Figure 10:
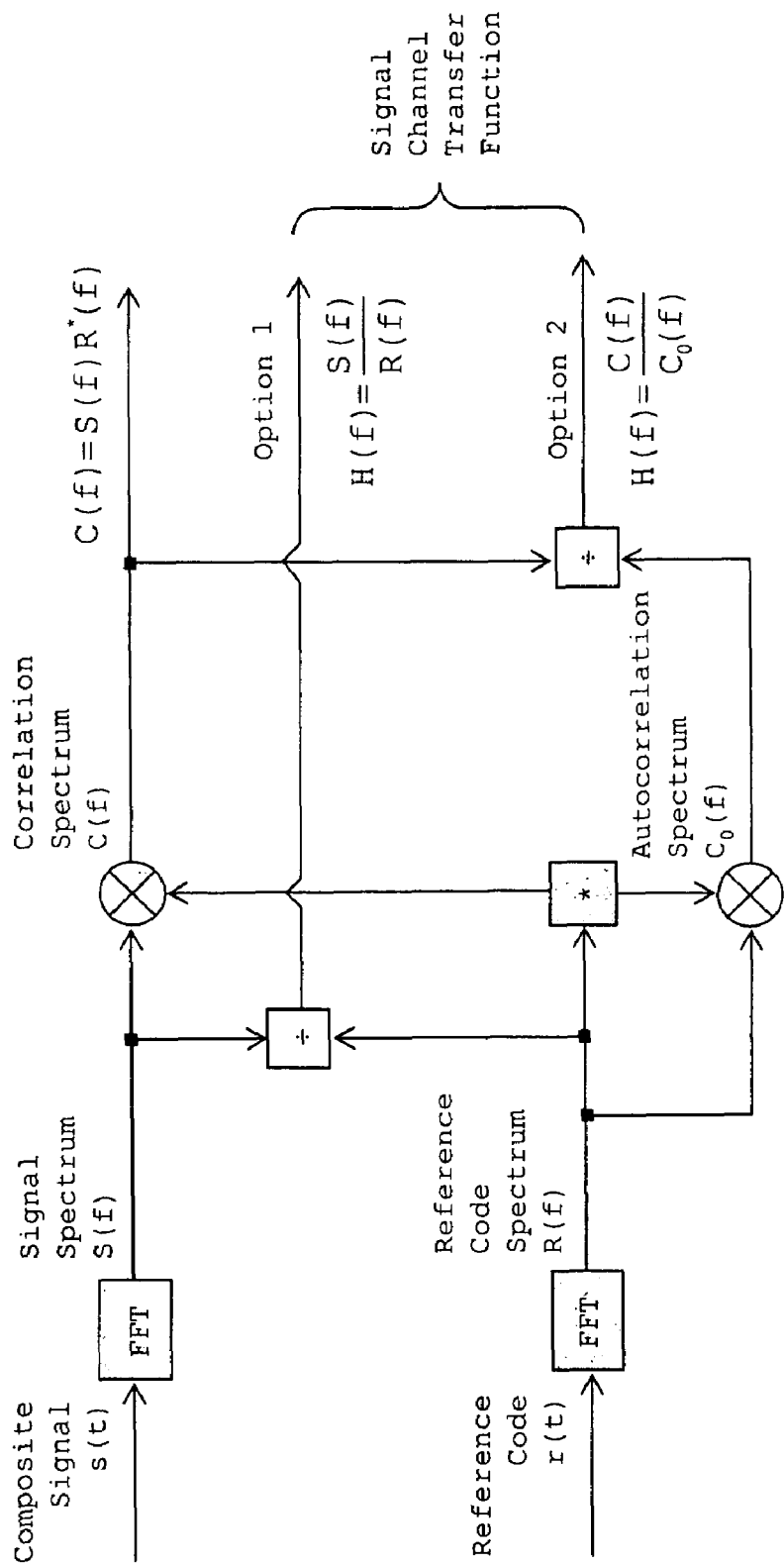
FIG. 10 is a schematic of an exemplary embodiment of method options for generating the signal channel transfer function in accordance with the present invention.

Referring to FIG. 7, the segmentation step 52 is followed by the step of translation 54 as graphically illustrated in FIG. 9c. Spectrum translation in the frequency domain is equivalent to multiplication with complex exponential in the time domain. This in fact performs phase-rotation of the incoming signals so as to remove any residual Doppler frequency shift in the signal. Since the spectrum translation only involves memory address manipulation, it is computationally much less expensive than conventional sequential multiplication. The translated spectrum segment is stored in an incoming spectrum sample buffer 56. Together with the reference code spectrum in the other spectrum sample buffer 66, the satellite signal channel transfer function estimation 68 is carried out with the results put into a transfer function buffer 70. As illustrated in FIG. 10, there are two methods to choose from to estimate the satellite signal channel transfer function based on Eq. (7). One is the use of the incoming signal and reference code spectra (Method 1) and the other is the use of the correlation and autocorrelation spectra (Method 2).

As illustrated in FIGS. 3b and 4b, the spectra of the BPSK and BOC modulation codes both have "crests" and "troughs." Since the thermal noise is white and thus uniform across the frequency axis, it becomes dominant wherever the signal is weak. More importantly, since the reference code spectrum has small values and even nulls near the multiple of the chipping rate, its inversion can produce large "spikes." To avoid such singularities, the transfer function filtering 72 is applied to the estimated spectrum. Two exemplary methods for transfer function filtering are zone-zeroing and individual excision. The zone-zeroing method resets a block of frequency bins that are around the multiple of chipping rate (i.e., replace with zeros) whereas the individual excision method inserts zeros only to individual frequency bins that are above a certain threshold, selected by counting the spectrum histogram for instance.

The final step in the satellite-specific operation 60a is the signal detection, code delay, carrier phase & frequency estimation, and data demodulation 78. Similar results from multiple satellites are passed to Blocks 32 and 36 of FIG. 6. Details will be provided when explaining subsequent figures.

For each spectrum translation, the processing steps 68, 72, and 74 produces the estimated impulse response for a particular Doppler frequency. This operation is repeated for a number of Doppler values in the acquisition mode to cover the entire frequency uncertainty. In the tracking mode, however, only few frequency bins are needed. Similarly, the entire impulse response is obtained by performing the full-length frequency-domain to time domain conversion 74 in the acquisition mode. But in the tracking mode, only few data points around the peak are inverted, thus providing additional computational savings.

In contrast to conventional receivers that attempt to lock onto the code phase and carrier phase/frequency with one-value point tracking loops, the present invention generates a two-dimensional map of the signal channel transmission power as function of the delay time (pseudo range) and Doppler frequency (range rate). Since this time-frequency map covers the Doppler frequency shift and code phase over a large area, any satellite signal of reasonable strength can be captured. The difference between acquisition and tracking disappears in this embodiment of open-loop estimation. As a result, the method of the present invention can operate in very high dynamics. The interpolated values for time and frequency using Eqs. (10) and (11) can be averaged over a longer time period to smooth out noise. A dynamic model can be also applied to further enhance such smoothing.

Figure 11:
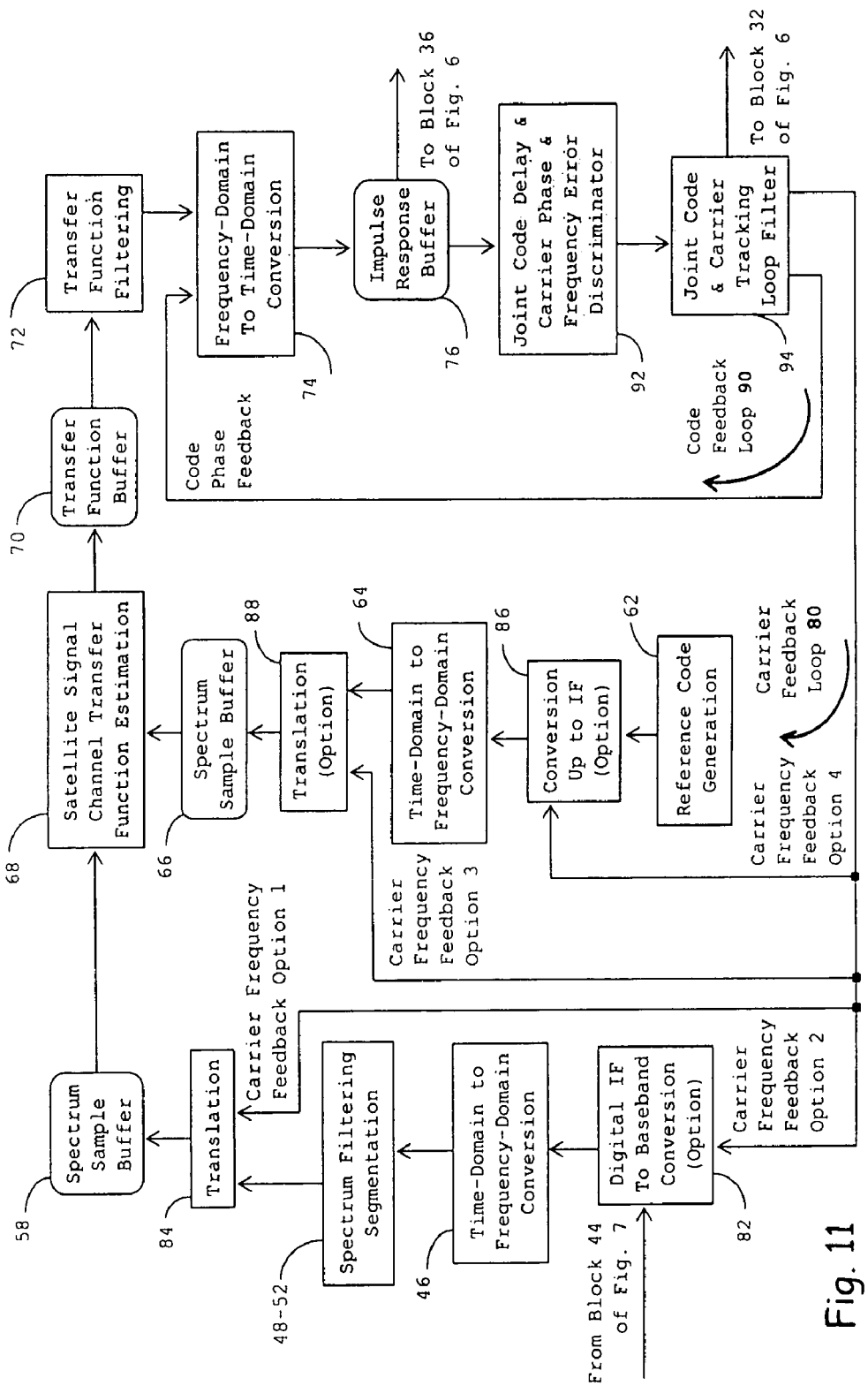
FIG. 11 is a schematic of an exemplary embodiment of an alternative baseband signal processor based on a closed-loop tracking method in accordance with the present invention.

In accordance with the present invention, a second embodiment of the baseband signal processor 20 using the estimated satellite signal channel impulse response is illustrated in FIG. 11 where the closed-loop tracking method is applied in the frequency domain in the discrete time. In comparison to the open-loop estimation embodiment of FIG. 7, there are several additional operational blocks and data connections. The outer carrier feedback loop 80 has four options to choose from to remove any Doppler frequency beyond the nominal IF frequency due to the satellite-receiver relative motion and/or clock instability. Options 1 and 2 attempt to move the incoming signal spectrum from the estimated Doppler frequency back to the baseband (i.e., the zero frequency at DC) while Options 3 and 4 move the reference code spectrum up from the baseband to match with the Doppler-shifted incoming signal spectrum at IF. Both Option 2 and Option 4 operate in the time domain with complex exponential multiplication (phase rotation) to achieve the digital IF to baseband conversion 82 and the conversion up to IF 86, respectively. On the other hand, Options 1 and 3 operate in the frequency domain with spectrum translation (index manipulation) to achieve the spectrum down translation 84 and up translation 88, respectively. In the incoming signal case, it is also possible to combine the time-domain and frequency-domain operations to remove the fractional and integer Doppler frequency components in units of frequency bin, respectively. The details of the two techniques and their equivalence are disclosed in U.S. Pat. No. 6,407,699 B1 issued Jun. 18, 2002 to the present inventor, which has been incorporated by reference.

Referring to FIG. 11, the inner code feedback loop 90 attempts to place a sampling point on the impulse response peak and this is done by first adjusting the transfer function by a fractional spacing and then inversing the spectrum at two or three data points around the impulse response peak. This significantly reduces the amount of computations otherwise required to perform the full inversion. The details of this technique for correlation function are disclosed in the paper entitled "Tracking of GPS Code Phase and Carrier Frequency in the Frequency Domain," presented by the inventor at the 16$^{th}$ International Technical Meeting of the Satellite Division of the Institute of Navigation in September 2003 in Portland, Oreg. which is readily adapted for the impulse response estimation in the present invention and is therefore incorporated into this specification by reference.

Referring to FIG. 11, the estimated impulse response is used to derive the joint code delay and carrier phase and frequency error discriminator 92. These errors are filtered by a joint code and carrier tracking loop filter 94 to close the code and carrier feedback loops 80 and 90, respectively. The loop filter also produces the code delay and carrier phase and frequency measurements as the output from this satellite channel to Block 32 of FIG. 6 for the position, velocity, and timing solution calculation. Similarly, the estimated impulse response for this satellite channel is also sent to Block 36 of FIG. 6 for the propagation and environment characterization.

Figures 12A, 12B:
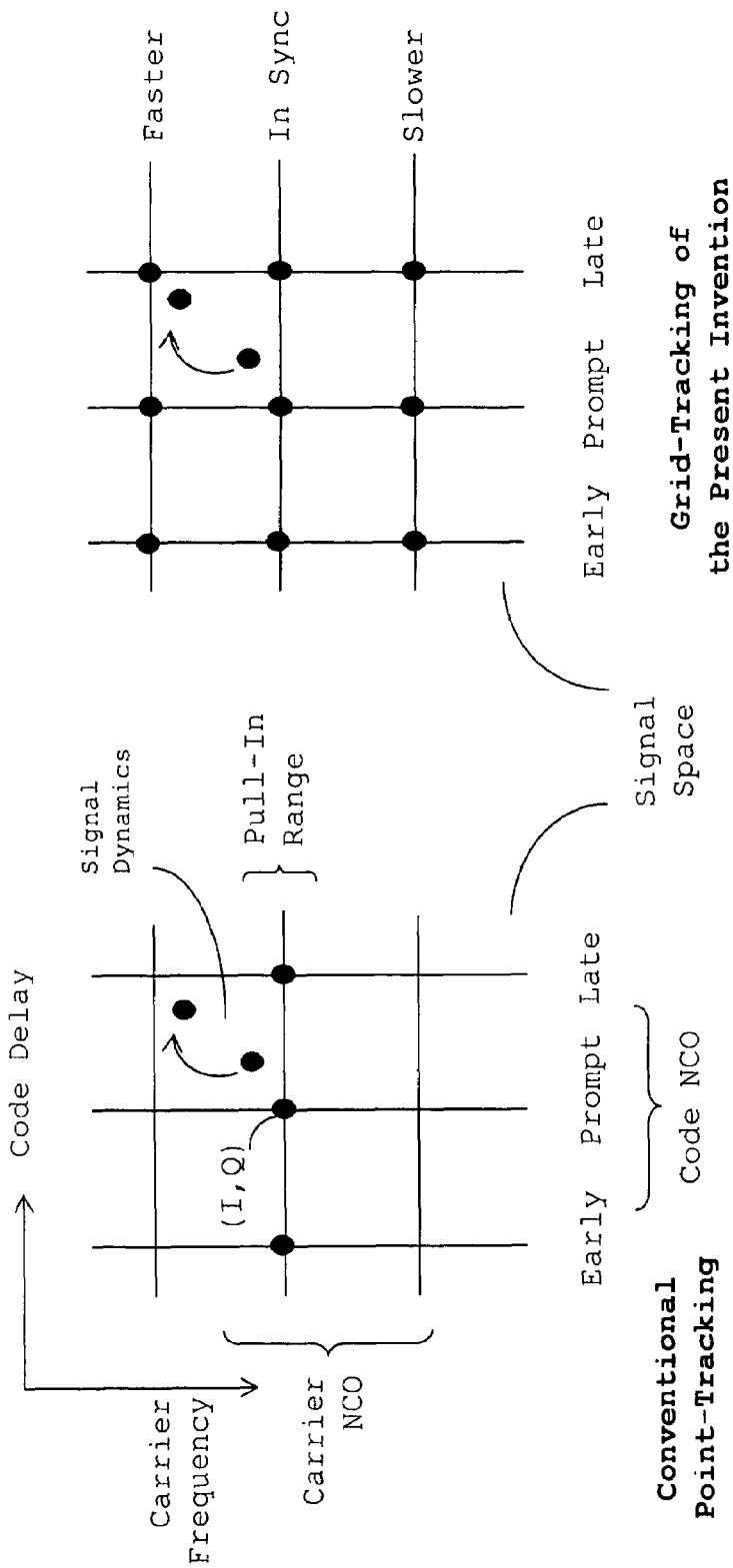
FIGS. 12a and 12b show a graphic comparison of the conventional point-values line-tracking (FIG. 12a) versus the proposed grid-values area-tracking (FIG. 12b) in the time-frequency uncertainty plan in accordance with the present invention.

In conventional GPS receivers, a delay-locked loop (DLL) makes use of a delay error discriminator for code tracking while a phase-locked loop (PLL) makes use of a phase error discriminator for carrier tracking. Sometimes, the carrier-tracking loop uses a frequency-locked loop (FLL) with a frequency error discriminator instead. Although the code delay error discriminator and the carrier phase error discriminator can derive the desired error estimate from the complex correlations per data window at the same sampling instant, a conventional frequency error discriminator needs the complex correlations over two data windows at two consecutive instants. Since two correlation intervals may saddle over a data bit sign transition, special care has to be taken of this implementation. These error discriminators are highly non-linear and have a rather small linear region as the operating interval, beyond which the output starts to be saturated and even becomes erroneous when the input is large. The conventional error discriminators actually allow "point-tracking" when it is viewed in the signal parameter space with code delay vs. carrier frequency as illustrated in FIG. 12a where the code phase is sampled at three lags known as "early," "prompt," and "late" but the carrier frequency is only represented by one value.

Since the weakest link in a GPS receiver is the carrier loop, the delay-Doppler mapping of complex correlation disclosed in U.S. Pat. No. 6,407,699 B1 issued Jun. 18, 2002 to the present inventor, which has been incorporated by reference, is expanded in the present invention for "grid-tracking. As shown in FIG. 12b, in addition to the three "early," "prompt," and "late" code phases along the time dimension, three carrier frequencies, known as "slower," "in-sync," and "faster," are further configured. In this way, any signal wandering around within this grid can always be captured. These integrated signal values (either complex correlation or impulse response) at the grid points can be used to derive the code phase and carrier phase and carrier frequency errors at the same time, leading to the joint error discriminator. In a sense, this implements a small-scale search constantly. Since the spacing between code phases and frequency values can be adjusted as needed, this error discrimination structure is referred as the multiresolution adjustable grid interpolating correlator (MAGIC) in the paper entitled "GPS Signal Tracking with Kalman Filter Based on Joint Code Delay and Carrier Phase and Frequency Error Discriminator," presented by the inventor at the 60$^{th}$ Annual Meeting of the Institute of Navigation in June 2004 in Dayton, Ohio, which is therefore incorporated into this specification by reference.

In conventional GPS receivers, the code and carrier tracking loops are typically designed separately and run "independently," although there may be some assistance (e.g., rate aiding) from the carrier loop to the code loop. In the conventional design, each tracking loop is represented with a small signal model, thus linear and time-invariant, for use of transfer functions. Classical control theory is applied to select the most appropriate loop filter parameters such as loop order and bandwidth. When the loop order is small (i.e., a 1$^{st}$ or 2$^{nd}$ order), the closed loop is unconditionally stable. However, to reduce steady-state errors for high dynamic signals, the loop order may be raised higher than the 3$^{rd}$. Then the stability becomes a design issue. Conventional loop filter designs use fixed-coefficients and the resulting performance is at best a compromise between the noise performance and the dynamic tracking capability. Although adaptive loop filters have been proposed in the past, their implementation and tuning are quite complicated. Rate aiding from an external sensor such as an inertial measurement unit (IMU) has been used for tightly coupled GPS/IMU implementation.

Referring to FIG. 11, the joint code delay and carrier phase and frequency error discriminator 92 is used to drive the joint code and carrier tracking loop filter 94 in accordance with the present invention. This concept of joint code and carrier tracking has been tested with real GPS data. The details of the approach as well as the processing results are disclosed in the paper entitled "GPS Signal Tracking with Kalman Filter Based on Joint Code Delay and Carrier Phase and Frequency Error Discriminator," presented by the inventor at the 60$^{th}$ Annual Meeting of the Institute of Navigation in June 2004 in Dayton, Ohio. In addition, the use of a multiple model estimator is disclosed in the same paper as an alternative way to adjust the tracking loop bandwidth adaptively, which is therefore incorporated into this specification by reference.

Referring back to FIG. 6, the data processor 30 has an additional functionality to provide propagation and environment characterization 36 in accordance with the present invention. The two-dimensional delay-Doppler mapping of the complex impulse response in the baseband signal processor 20 enables the measurement of fluctuations of GPS signal powers in wideband and narrowband as well as their ratio over time. This provides the basis to characterize the propagation media related to ionospheric activities. In addition, it allows measuring the time and frequency spread of the impulse response peak with a much refined resolution so that major multipath components (individual specular components and/or diffuse power profile) can be analyzed. In conjunction with an array of antennas with dual circular polarization, the directions of arrival (DOA) of direct and multipath signals can be determined to form an environment map with reflecting surface properties and compositions. The details of a technique to determine the GPS signal direction of arrival with an array antenna are disclosed in U.S. Pat. No. 6,598,009, issued Jul. 22, 2003, entitled Method and Device for obtaining Attitude under Interference by a GPS Receiver Equipped with an Array Antenna, to the present inventor, the specification of which is incorporated into this specification by reference.

Although the description above contains much specificities, these should not be construed as limiting the scope of the invention but as merely providing illustrations of some of the presently preferred embodiments of this invention. For example, the present invention provides a generic signal processing architecture of versatility where many processing blocks can be tailored to achieve a desired combination of functionalities. Some time-domain and frequency-domain processing blocks are complementary for one application but redundant for another. As a result, some blocks may be made optional and others are omitted. Flexibility is also provided for design parameters tradeoff to best suit a particular application. A non-parametric method in the frequency domain with Fourier transform is illustrated in the present invention as the preferred method. Other non-parametric methods in the frequency-domain and time-domain as well as parametric methods can be used to estimate the satellite signal channel transfer function and impulse response. Although the description is focused on one user with a single satellite, the principle can be extended to the cases with multiple satellites, therefore forming a multi-input and multi-output (MIMO) system with cross-coupling between satellites in the constellation accounted for. Although the digital methods with FFT and DFT have been described for domain conversions in the preferred embodiment, other means such as electro-optics can also be used. Reference has been made mostly to the GPS signals but the present invention is equally applicable to the European GALILEO system the Russian GLONASS system and other new components of the GNSS in general. The processing of the present invention can also be carried out in a remote processing center physically separated from a receiver's RF front-end. The satellite signal channel impulse response can also be estimated over several milliseconds to improve sensitivity. Advanced techniques such as applying spectrum windowing can be used to lower the sidelobes of the impulse response at the expense of slight widening of the mainlobe. The satellite signal channel impulse response of the present invention can also be viewed as a generalized cross-correlation. It also can be constructed as a phase-only matched filter, which can produce a very sharp peak with a slightly elevated noise floor. Alternative to zone-zeroing and excision, such nonlinear techniques as amplitude-compensated filtering can be applied for spectrum shaping. Furthermore, a symmetric phase-only matched filter can be used wherein a scaling inversely proportional to amplitude is applied to both the incoming signal and code replica spectra.

It is understood that the various figures described above illustrated only the preferred embodiments of the present invention system and method. A person skilled in the art can therefore make numerous alterations and modifications to the described embodiments utilizing functionally equivalent components and method steps to those shown and described. All such modifications are intended to be included within the scope of the present invention as defined by the appended claims.

What is claimed is:

1. In a navigational system utilizing a plurality of satellites having time and orbit information, that transmit radio-frequency signals embedded with said time and orbit information, a method of obtaining a navigational solution, comprising the steps of:

providing an incoming signal forward transformation system that is not satellite specific, wherein said incoming signal forward transformation system receives the radio-frequency signals from a plurality of the satellites and converts the radio-frequency signals received to a predetermined intermediate frequency, therein producing converted signals;

providing a satellite specific processing system, wherein said satellite specific processing system obtains signals corresponding to different satellites contained within said plurality of satellites from said converted signals and generates a local reference code for said different satellites;

obtaining a satellite signal channel transfer function;

filtering said satellite signal channel transfer function to produce a filtered satellite signal channel transfer function;

converting said filtered satellite signal channel transfer function to a time domain, yielding an estimated satellite signal channel impulse response, therein processing said converted signals and said reference code for each said different satellite to form a satellite signal channel impulse response estimate for each said different satellite;

utilizing each said satellite signal channel impulse response estimate to extract navigation data, code time, carrier phase and frequency parameters from said radio-frequency signals; and utilizing said navigation data, said code time, said carrier phase and said frequency parameters from said plurality of satellites to produce a navigation solution.

2. The method according to claim 1 further includes the step of utilizing said satellite signal channel impulse response estimate, said navigation solution, and said navigation data to determine signal propagation and environment characteristics.

3. The method according to claim 1, wherein said step of filtering said satellite signal channel transfer function includes the step of:

zone-zeroing said satellite signal channel transfer function in those frequency bins around multiples of a code chipping rate.

4. The method according to claim 1, wherein said step of filtering said satellite signal channel transfer function includes the step of:

excising said satellite signal channel transfer function in frequency bins where noise power exceeds a pre-defined threshold.

5. The method according to claim 1, wherein said step of obtaining said satellite signal channel transfer function includes the step of:

generating a reference code spectrum from said reference code;

obtaining a satellite-specific translated signal spectrum from said converted signal; and processing said reference code spectrum and said satellite-specific translated signal spectrum into said satellite signal channel transfer function.

6. The method according to claim 5, wherein said step of obtaining said satellite-specific translated signal spectrum from said converted signal includes the steps of:

holding said converted signal in a double-length time sample buffer;

transforming said converted signal in double-length time sample buffer to the frequency domain to form converted signal spectrum;

applying spectrum filtering to said converted signal spectrum; and processing said converted signal spectrum into said satellite-specific translated signal spectrum.

7. The method according to claim 6, wherein said step of applying spectrum filtering to said converted signal spectrum includes the steps of:

excising frequency bins of said converted signal spectrum above a pre-defined threshold.

8. The method according to claim 6, wherein said step of applying spectrum filtering to said converted signal spectrum includes the steps of:

weighting said converted signal spectrum according to a pre-defined function.

9. The method according to claim 6, wherein said step of processing said converted signal spectrum into said satellite-specific translated signal spectrum includes the steps of:

obtaining a satellite-specific signal spectrum from said converted signal spectrum by segmenting out those frequency bins that belong to the specific satellite and code of interest; and translating said satellite-specific spectrum up and down circularly along a frequency axis, thereby creating said satellite-specific translated signal spectrum.

10. The method according to claim 9, wherein said step of translating said satellite-specific spectrum up and down circularly along the frequency axis further includes the step of looping through a range of Doppler shifts pre-selected or determined from estimated frequency.

11. The method according to claim 5, wherein said step of processing said reference code spectrum and said satellite-specific translated signal spectrum into said satellite signal channel transfer function includes the step of:

dividing said satellite-specific translated signal spectrum by said reference code spectrum at valid frequency bins.

12. The method according to claim 11, further including the steps of:

obtaining said cross-correlation spectrum by multiplying said satellite-specific translated signal spectrum and the conjugate of said reference code spectrum on a frequency bin to bin basis; and obtaining said auto-correlation spectrum by multiplying said reference code spectrum and said conjugate of said reference code spectrum on a frequency bin to bin basis.

13. The method according to claim 5, wherein said step of processing said reference code spectrum and said satellite-specific translated signal spectrum into said satellite signal channel transfer function includes the step of:

dividing cross-correlation spectrum by autocorrelation spectrum at valid frequency bins.

14. The method according to claim 1, wherein said step of converting filtered satellite signal channel transfer function to a time domain, further includes the step of performing inverse discrete Fourier transforms for each translated signal spectrum at time lags, thereby forming a delay-Doppler map or sub-map of impulse response.

15. The method according to claim 1, wherein said step of extracting code time and carrier phase and frequency parameters, further includes the steps of:

creating a two-dimensional map of impulse response in terms of early, prompt, and late code lags vs. slower, in-sync, and faster frequency values;

generating a joint code delay and carrier phase and frequency error discriminator per data window by interpolating the impulse response power over the time and frequency grid points and taking arctangent of the complex peak impulse response;

processing the joint code delay and carrier phase and frequency error discriminator through a joint code and carrier tracking filter; and sending the filtered code delay and carrier phase and frequency back to said frequency to time conversion and said time to frequency conversion, respectively, therefore closing the code feedback loop and carrier feedback loop.

16. The method according to claim 1, wherein said step of utilizing said satellite signal channel impulse response estimate to extract navigation data and code time and carrier phase and frequency parameters, further includes the steps of:
   detecting the presence of said signal by threshold testing;
   interpolating delay and Doppler estimates to a predetermined resolution;
   generating a pseudo range measurement from an interpolated delay estimate and a local time tag;
   generating a delta range measurement from the interpolated Doppler estimate and the selected Doppler shift; and
   generating a carrier phase measurement from an interpolated complex signal peak power and the estimated Doppler frequency.

17. The method according to claim 16, further includes the steps of:
   generating an estimate of carrier to noise density ratio;
   achieving a navigation data bit sync based on a series of complex signal values; and
   formatting a time tag, pseudo range, delta range, carrier phase, carrier-to-noise ratio, and bit sync into a pre-specified set of GPS observables.

18. The method according to claim 16, further includes the step of:
   decomposing an interpolated time location of the impulse response peak into an integer part and a fractional part in units of sampling interval;
   shifting the channel transfer function through multiplying complex exponentials by the amount of fractional part; and
   specifying a reduced range of delay lags around the integer part for inverse transformation of transfer function in the frequency domain to impulse response in the time domain.

19. The method according to claim 16, further includes the step of:
   down-converting the received signal samples through multiplying complex exponentials by the amount of interpolated frequency location of the impulse response peak.

20. The method according to claim 16, further includes the step of:
   up-converting the reference code through multiplying complex exponentials by the amount of interpolated frequency location of the impulse response peak.

21. The method according to claim 16, further includes the step of:
   decomposing an interpolated frequency location of the impulse response peak into an integer part and a fractional part in units of frequency bin; and
   specifying a reduced range of Doppler frequency shifts for the frequency-domain Doppler removal from the converted signals or for the frequency-domain Doppler insertion for the reference code.

* * * * *